July 21, 1964 M. A. GEORGE 3,141,929

DATA TRANSMISSION SIGNAL GATING APPARATUS

Filed Jan. 2, 1962

INVENTOR
MARGARET A. GEORGE

BY *Frederick D. Poag*

ATTORNEY 3,141,929

DATA TRANSMISSION SIGNAL GATING APPARATUS

Margaret A. George, Washington, D.C., assignor to International Business Machines Corporation, New York, N.Y., a corporation of New York Filed Jan. 2, 1962, Ser. No. 163,736
5 Claims. (Cl. 178—66)

This invention relates to data transmission devices, and more particularly to an improved circuit for controlling the transmission of cycles of a signal wave in accordance with a data-significant input.

One method of transmitting digital data from one location to another, useful especially when it is desired to employ telephone lines in the data link, is to encode a wave, such as a low frequency sine wave, in accordance with serial readout of the data. For example, in the transmission of binary coded data, one full sine wave of a predetermined frequency may indicate a "1," while absence of the signal for a time equal to the period of that wave may indicate a "0." Alternatively, the system may be such that reversal of the phase of the signal may be indicative of a "0."

A convenient method of generating a train of signals of this kind is to provide a sine wave generator, and control apparatus connected to gate output signals from the generator to the transmission line system in accordance with the data to be transmitted. In order to avoid error productive level shifts as the signal wave is turned on and off, it is important that the D.C. value (or reference) of the output during the period representative of a "0" be the same as the D.C. reference of the sine wave representative of a "1."

In accordance with the present invention a balanced double gate is provided which is operative in response to a data significant input, to pass or block, selectively, a sine wave signal. Alternatively, the gate may be arranged to switch between transmission of a first symmetrical periodic wave, such as a sine wave, and a contrasting wave, such as a sine wave of opposite phase. The gate is characterized by a single output under the control of a pair of transistors which operate in a binary manner. When the gate is "conditioned" (or transmitting a "1"), a first of the transistors is biased to operate in the active region and the other is biased beyond cut-off, while the reverse is true when the gate is deconditioned, that is, is in a state to transmit a "0." The two active-region biases are the same, so that the active region quiescent operation points of the transistors have the same output current values.

In accordance with one mode of operation, a sine wave to be gated is A.C. coupled to the base of the first transistor, and when the gate is conditioned a sine wave appears at the output which has a D.C. reference which is the same as the output when the gate is deconditioned. Alternatively, where a different wave, such as one of opposite phase from that of the first, is to be passed when the gate is "deconditioned," such other wave is A.C. coupled to the base of the second transistor.

Accordingly, a principal object of the present invention is to provide an improved gating circuit for control of a sine or similar periodic wave wherein the D.C. reference of the output wave when the gate is conditioned is the same as the D.C. value or reference of the output when the gate is deconditioned.

Another object of the invention is to provide a circuit as aforesaid wherein the output amplitude is controlled accurately.

Still another object of the invention is to provide, in circuit arrangement as aforesaid, a gate characterized by low bulk so as to enable compact packaging.

Yet another object of the invention is to provide a gating circuit as aforedescribed wherein the reference level of the source periodic wave, the levels of the conditioning-deconditioning gating control, and the output power supply voltage are each non-critical.

Another object of the invention is to provide a circuit as aforesaid utilizing gate transistors in a manner which provides a high output impedance employed in parallel with a collector load resistor which may be chosen within wide limits, so as to facilitate matching of the output of the gate circuit as whole with impedances of the order encountered in telephone line transmission systems, without need for an intervening amplifier, and, further, to render the impedance match relatively insensitive to the beta of the transistors utilized.

The foregoing and other objects, features and advantages of the invention will be apparent from the following more particular description of preferred embodiments of the invention, as illustrated in the accompanying drawings.

Figure 1:
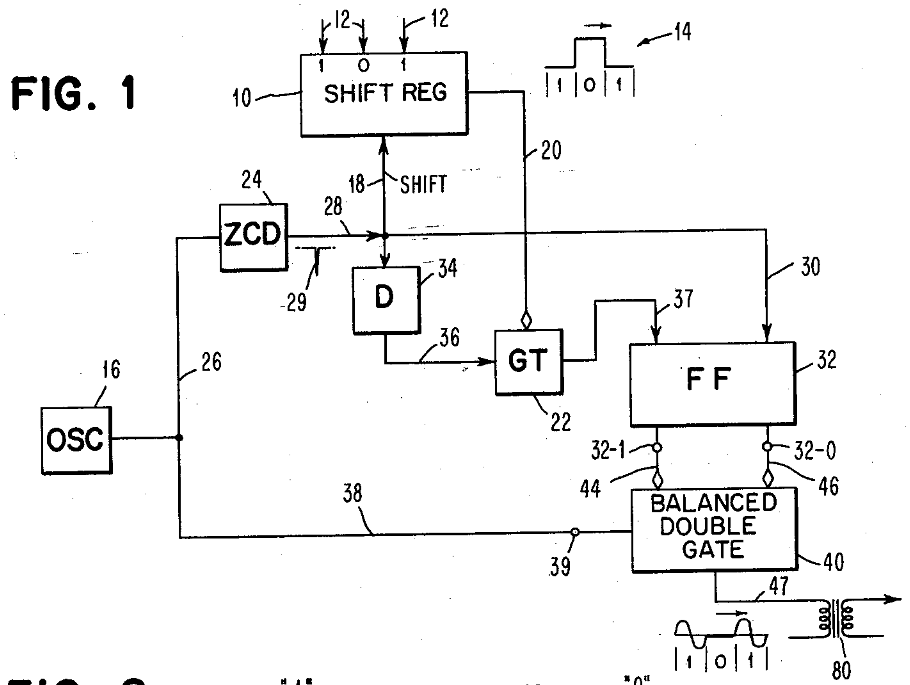
FIG. 1 is a schematic diagram of a portion of a data transmission system including sine wave gating apparatus in accordance with the invention.

Referring now more particularly to FIG. 1, a system in which gating apparatus in accordance with the invention finds utility may include, for example, a shift register 10 into which binary data to be transmitted is loaded, by means of parallel input lines 12. For purposes of illustration of operation, it is assumed that the binary word "101" has been loaded into the register. The register 10 is exemplary merely of any means whereby data to be transmitted can be made available as a series of data significant levels as indicated at 14, in timed relationship to the operation of a source, such as an oscillator 16, of sine waves to be gated. Accordingly, register 10 may be a simple four bit flip-flop (bistable multivibrator) shift register of the kind provided with three broadside data inputs 12 and a shifting command input line 18, with the lowest order flip-flop having no broadside input 12 but rather being reserved as an output stage. Application of shift pulses on line 18 causes the contents of the register to shift toward the low order end of the register one order at a time, so as to be available in serial fashion as successive levels at the output of the lowest order flip-flop of the register. This output 14 is transmitted via line 20 to the conditioning input of a gate circuit 22, also of conventional design.

A once-per-cycle zero crossing detector 24 is connected by line 26 to provide on line 28 a timing pulse 29 in response to each negative-going A.C. zero crossing of the sine wave provided by oscillator 16. One type of zero crossing detector suitable for this purpose is the kind comprising a series of cascaded amplifier stages, which saturate to convert the zero crossing slopes of the input sine wave into the zero crossing portions of a square wave, followed by conventional differentiating and positive pulse clipping elements. The output of the detector is the timing pulse 29 which is substantially coincident with zero crossing of the sine wave in the desired direction, and of comparatively very short duration. For a more detailed example of a zero crossing detector, reference may be had to the circuit shown in FIG. 16 of U.S. Patent No. 2,988,735 to Everett et al., issued June 13, 1961.

The timing pulse on line 28 is applied to line 18 to shift register 10 and, at the same time on line 30 to the "clear" input of flip-flop (bistable multivibrator) 32. It is also applied, through a delay 34 to the sampling pulse input line 36 of gate 22, the output of which is connected via line 37 to the "set" input of flip-flop 32. Accordingly, at the time of each negative going zero crossing of the sine wave on line 26, the content of register 10 is shifted one order position and flip-flop 32 is cleared. After an interval provided by delay 34, sufficient for register 10 and flip-flop 32 to settle, the timing pulse samples the gate 22. If the level present on line 20 is the "1" significant level, illustrated at 14 to be the more negative of the two levels of output characteristic of register 10, gate 22 provides a pulse on its output line 37 to set flip-flop 32. If instead, the output of register 10 on line 20 had been of "0" significance, gate 22 would not have conditioned and flip-flop 32 would have remained in its cleared condition.

Thus, at the beginning of each cycle of the sine wave supplied by oscillator 16, in this case, arbitrarily, the negative-going beginning, flip-flop 32 is cleared and then, if the data bit to be transmitted is a "1," is set. Typically, the frequency of the sine wave to be gated is 1300 cycles per second, so that this series of events takes place within a period of time which is insignificant compared to the period of the sine wave. From the foregoing it will be seen that flip-flop 32 comprises data responsive means operative to produce, at its respective output terminals 32–1 and 32–0, complementary level signals the binary status of which is data-significant. In the illustrated circuit arrangement, the flip-flop 32 is operative to supply ground and negative output levels at its terminals 32–1 and 32–0, respectively, while in set condition, and the converse while in its cleared state. A suitable flip-flop circuit for this purpose is shown in FIG. 1 of United States patent application Serial Number 745,886, filed July 1, 1958, now U.S. Patent No. 3,045,128.

In adidtion to the aforedescribed timing usage, the sine wave output of oscillator 16 is applied, on line 38, to input terminal 39 of a balanced double gate 40. Gate 40 has conditioning and deconditioning input lines 44, 46 connected to flip-flop output terminals 32–1 and 32–0, and is operative, in accordance with the invention, to transmit the sine wave to its output on line 47 if gate 40 is conditioned by the presence of a "1" significant ground level on line 44, and to provide instead an unvarying level output if gate 40 is deconditioned by the presence of a "0" significant ground level on line 46.

Figure 2:
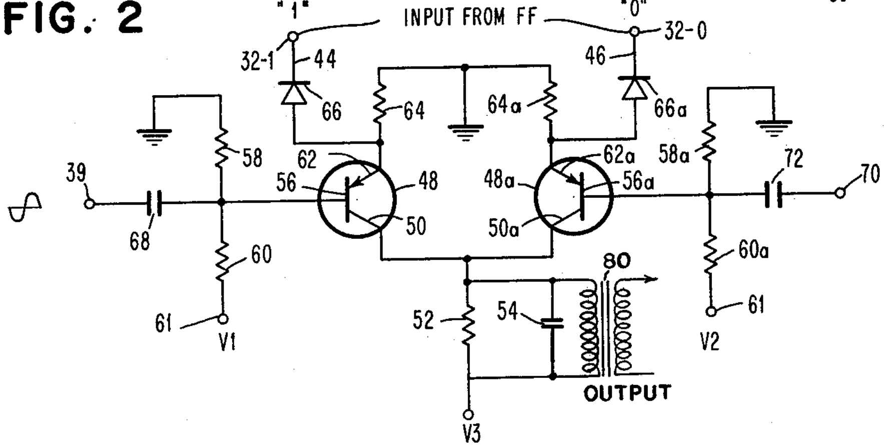
FIG. 2 is a circuit diagram of a double gate in accordance with the invention, constituting a part of the apparatus of FIG. 1.

The circuit diagram of a preferred embodiment of double gate 40 is shown in FIG. 2. The gate includes a pair of transistors 48, 48*a* of the same type, the collectors 50, 50*a* of which are connected in parallel to a common load resistor 52 across which the output of the circuit is taken. Preferably, a capacitor 54, of a value which presents a high impedance to the sine wave frequency being gated, is provided across load resistor 52 for the purpose of suppressing high frequency transients.

Means are provided to bias each of the transistors 48, 48*a* for operation, when turned on, at the same quiescent or D.C. operating point. For this purpose the bases 56, 56*a* of the transistors are given substantially identical D.C. operating levels by companion bias supplies including matched dividers consisting of resistances 58, 60 and 58*a*, 60*a* across identical voltage supplies V1 and V2, respectively, and the emitters 62, 62*a* of the transistors are connected through matched resistors 64, 64*a* to ground. Preferably the terminal 61 of V1 and V2 is physically one and the same terminal of a single voltage supply, so that supplies V1 and V2 always have identical value.

Emitter resistors 64, 64*a* are provided principally to permit a potential level shift to be applied selectively to one or the other of the emitters 62, 62*a* for biasing the corresponding transistor beyond cutoff. However, the emitter resistor 64, 64*a* serve the further purpose of providing a degree of negative feedback to operation of the associated transistor which renders differences in the operating characteristics of the two transistors relatively unimportant to balanced operation of the circuit.

Each of the emitters 62, 62*a* is further connected through a diode 66, 66*a* poled in opposition to the emitter-base junction of the corresponding transistor, to the complementary, data significant, levels available on lines 44, 46 from the output of flip-flop 32. Accordingly, when the potential on line 44 is at its more positive, "1" significant level (ground), diode 66 is back-biased so as to enable transistor 48 to conduct at an operating point established by the D.C. reference provided to its base by divider 58, 60. At the same time, the emitter 62*a* of transistor 48*a* is clamped through forward-biased diode 66*a* to the negative level on line 46 and is therefore biased beyond cutoff. When the condition of flip-flop 32 is reversed by the storage therein of a "0" data bit the potential relationship of its output lines 44, 46 is reversed, and transistor 48 is biased beyond cutoff while transistor 48*a* conducts at the predetermined quiescent operating point.

The sine wave to be gated is connected through D.C. isolating capacitor 68 to the base 56 of transistor 48 for operation of that transistor in a Class A swing about the predetermined, balanced quiescent operating point. Accordingly, the sine wave appearing at the output of the gate, across load resistor 52, when transistor 48 is operating has the same D.C. reference as the D.C. level appearing at that output when transistor 48*a* is on and transistor 48 is off.

It will be understood that, for undistorted passage of the sine wave through the gate the base D.C. reference applied to the transistors 48, 48*a* should be larger than the A.C. swing of the sine wave as applied to base 56 of transistor 48, and for insuring that the cutoff condition of transistor 48 remains undisturbed by the sine wave signal applied at its base, the negative level applied to input line 44 of gate 40 should be larger (more negative) than the negative excursion of that signal by an amount at least equal to the forward drop of diode 66.

Typical values and components which may be employed in the double gate 40 are as follows:

| | |
|---|---|
| Transistor 48 | PNP type 2N428. |
| Transistor 48*a* | PNP type 2N428. |
| Diode 66 | 1N1093. |
| Diode 66*a* | 1N1093. |
| Resistor 64 | 150 ohms, 0.1%. |
| Resistor 64*a* | 150 ohms, 0.1%. |
| Resistor 52 | 604 ohms, 1.0%. |
| Resistor 58 | 110 ohms, 0.1%. |
| Resistor 58*a* | 110 ohms, 0.1%. |
| Resistor 60 | 100 ohms, 0.1%. |
| Resistor 60*a* | 100 ohms, 0.1%. |
| Reflected external load on line 47 | 600 ohms. |
| Capacitor 68 | 47 micro-farads. |
| Capacitor 72 | 47 micro-farads. |
| Capacitor 54 | 0.033 micro-farad. |
| V1 and V2 (preferably physically the same supply) | −3.5 volts. |
| V3 | −9.5 volts. |
| Switching input on line 44 | Ground when flip-flop (32) set. −3.5 volts when flip-flop (32) is cleared. |
| Switching input on line 46 | −3.5 volts when flip-flop (32) is set. Ground, when flip-flop (32) is cleared. |
| Sine wave input at terminal 39 | 2 volts, peak to peak. |

Referring again to FIG. 1, delay 34 and gate 22 may be of any suitable types. For example, delay 34 may comprise a lumped capacitance-inductance delay line with a shaper output, and gate 22 may be of the type shown in U.S. patent application Serial No. 784,210 filed December 31, 1958, now U.S. Patent No. 3,079,511.

While it is important that the quiescent operating point of the two transistors 48, 48*a* be the same, it is, of course, of no importance if the switching potentials applied to lines 44, 46 are different. Accordingly, it is sometimes convenient to interpose an amplifier stage at the "1" (line 44) input to the gate. If such an amplifier is an inverter, then, of course, its input can be derived from the same source as the "0" input for the gate 40, for example from output terminal 32–0 of flip-flop 32. Although, in such a modification, the data information would be derived from the single "0" side of the flip-flop 32, the gate 40 would still be supplied with dual, complementary inputs the binary status of which identifies the data bit to be transmitted.

It will be appreciated that the balanced double gate 40 of the invention is subject to other modifications and variations in employment. For example, in some data transmission systems it is desired to gate between two sine waves of opposite phase while maintaining the same D.C. reference. In such case, a second A.C. input terminal 70 of the gate is utilized. This terminal is coupled by capacitor 72 to the base 56*a* of transistor 48*a* to complete the symmetry of the gate. An employment of double gate 40 in this manner is illustrated in FIG. 3.

Figure 3:
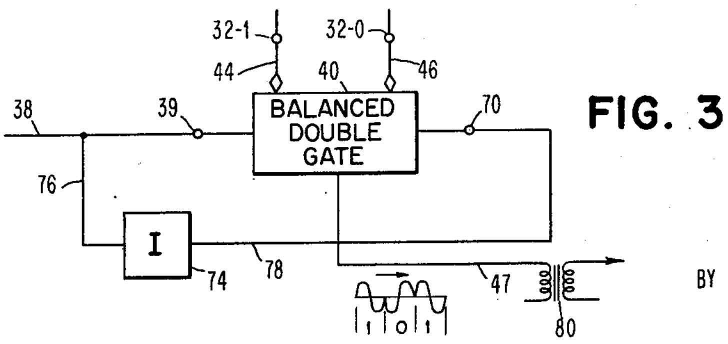
FIG. 3 is a fragmentary schematic diagram, illustrative of a modification to the system of FIG. 1.

In the modified gating arrangement of FIG. 3, the switching or "conditioning" and "de-conditioning" inputs 44, 46 of gate 40 are connected respectively to flip-flop output terminals 32–1 and 32–0, and sine wave supply line 38 is connected to the first A.C. input terminal 39 of the gate, all as described with respect to the system of FIG. 1. However, in addition, an inverter 74 is provided which has its input supplied from line 38 via line 76. The output of the inverter, which is a sine wave of the same amplitude as, but opposite in phase from, the sine wave on line 38, is delivered via line 78 to the second A.C. input terminal 70 of double gate 40. Accordingly, in FIG. 3, the output of gate 40 on line 47 is a wave of one phase when flip-flop 32 (not shown in FIG. 3) is in its set or "1" indicative state, and a sine wave of the opposite phase when that flip-flop is in its cleared or "0" indicative state.

Inverter 74 may take any suitable form; for example it may be of the kind comprising an active region biased transistor having emitter and collector resistors of substantially the same value, for unity gain, with the input sine wave A.C. coupled to the transistor base and the inverted phase output taken at the collector.

From the foregoing it will be seen that the gating apparatus of the invention provides a selection of outputs having, within very close limits, the same D.C. value. Any short term discontinuity during switching of the high speed circuit is suppressed by capacitor 54. Not only is the double gate 40 balanced in every respect, but in the preferred embodiments described hereinabove, depends for that balance largely on the symmetrical arrangement of resistors in the circuit. Since resistors can be made and/or selected to very close tolerances and manufactured in accordance with well known principles from materials which have virtually no aging or drift, the balance of the double gate circuit, so far as these elements are concerned, can be maintained virtually permanently. By operation of the emitter resistors, the output of the double gate transistors is primarily a function of the alpha of each transistor, and since the alpha does not vary greatly from transistor to transistor of the same type, nor with aging, difficulties of balance and maintenance of balance arising from differing characteristics and change in characteristics of the transistors are minimized.

While the base bias voltage supply may drift somewhat as its components age, this will not affect the output of the gating circuit since the transistors operate in the linear, active region and long term drift in D.C. reference is not transmitted through the output transformer 80 of the apparatus. It is for this reason that it is preferred that the base bias dividers 58, 60 and 58A, 60A be connected across one and the same voltage supply. In this way, such drift as there may be in this supply will be identical with respect to each base; otherwise, a D.C. reference shift, sought to be avoided by the invention, might result when the gate 40 was switched from operation of one transistor to operation of the other.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In a data transmission apparatus, in combination, a source of periodic waves, data responsive means operative to produce at respective terminals complementary level signals the binary status of which is data-significant, and balanced double gate means comprising a pair of transistors of the same conductivity type, each said transistor having an emitter, a base and a collector, said collectors being connected to load impedance means presenting the same resistance to current from each of said collectors, means connecting said source of periodic waves to one of said bases, matched Class A bias supplies connected to said bases, and selective cut-off means comprising a circuit connection between each of said emitters and a respective one of said terminals of said data responsive means adapted to cut one of said transistors off and render the other conductive in its active region in accordance with the status of said data responsive means, said gate means being symmetrical and operative in response to said bias supplies to yield the same D.C. output component to said load impedance irrespective of which of said transistors is conductive.

2. In a data transmission apparatus, in combination, a source of periodic waves, data responsive means operative to produce at respective terminals complementary level signals the binary status of which is data-significant, and balanced double gate means comprising a pair of transistors of the same conductivity type, each said transistor having an emitter, a base and a collector, said collectors being connected to one side of a common load resistor, D.C. isolating means connecting said source of periodic waves to one of said bases, matched Class A bias supplies connected to said bases and matched emitter resistors connected to said emitters, and selective cut-off means comprising a circuit connection between each of said emitters and a respective one of said terminals of said data responsive means adapted to cut one of said transistors off and render the other conductive in its active region in accordance with the status of said data responsive means, each said cut-off means connection including in series an asymmetrically conductive device poled in opposition to the emitter-base junction of the transistor controlled thereby, said gate means being symmetrical and operative in response to said bias supplies to yield the same D.C. output component to said load resistor irrespective of which of said transistors is conductive.

3. In a data transmission apparatus, in combination, a first and second source means of periodic waves having contrasting characteristics, data responsive means operative to produce at respective terminals complementary level signals the binary status of which is data-significant, and balanced double gate means comprising a pair of transistors of the same conductivity type, each said transistor having at least an emitter, a base and a collector, said collectors being connected to one side of a common load resistor, D.C. isolating means connecting said first source means of periodic waves to one of said bases and said second source means to the other of said bases, matched Class A bias supplies connected to said bases and matched emitter resistors connected to said emitters, and selective cut-off means comprising a circuit connection between each of said emitters and a respective one of said terminals of said data responsive means adapted to cut one of said transistors off and render the other conductive in its active region in accordance with the status of said data responsive means, each said cut-off means connection including in series an assymmetrically conductive device poled in opposition to the emitter-base junction of the transistor controlled thereby, said gate means being symmetrical and operative in response to said bias supplies to yield the same D.C. output component to said load resistor irrespective of which of said transistors is conductive.

4. In a data transmission apparatus, in combination, a source of sine waves, data responsive means operative to produce at respective terminals complementary level signals the binary status of which is data-significant, and balanced double gate means comprising a pair of transistors of the same conductivity type, each said transistor having an emitter, a base and a collector, said collectors being connected to one side of a common load resistor, D.C. isolating means connecting said source of periodic waves to one of said bases, matched Class A bias supplies comprising independent resistance dividers connected across a common potential source and connected at matched intermediate points to respective ones of said bases, matched emitter resistors connected to said emitters, and selective cut-off means comprising a circuit connection between each of said emitters and a respective one of said terminals of said data responsive means adapted to cut one of said transistors off and render the other conductive in its active region in accordance with the status of said data responsive means, each said cut-off means connection including in series an assymmetrically conductive device poled in opposition to the emitter-base junction of the transistor controlled thereby, said gate means being symmetrical and operative in response to said bias supplies to yield the same D.C. output component to said load resistor irrespective of which of said transistors is conductive.

5. In a data transmission apparatus, in combination, a source of sine waves, data responsive means comprising a flip-flop operative to produce at respective terminals complementary level signals the binary status of which is data-significant, the level changes at said terminals each being between a negative potential and a relatively more positive level, and balanced double gate means comprising a pair of PNP transistors, each said transistor having an emitter, a base and a collector, said collectors being connected to one side of a common load resistor, D.C. isolating means connecting said source of periodic waves to one of said bases, matched Class A bias supplies comprising independent resistance dividers connected across a common potential source and connected at matched intermediate points to respective ones of said bases, matched emitter resistors connected to said emitters, and selective cut-off means comprising a diode connected between each of said emitters and a respective one of said terminals of said data responsive means adapted to cut one of said transistors off and render the other conductive in its active region in accordance with the status of said data responsive means, said gate means being symmetrical and operative in response to said bias supplies to yield the same D.C. output component to said load resistor irrespective of which of said transistors is conductive, each said diode being poled in opposition to the emitter-base junction of the transistor to which it is connected, and an output transformer having its primary connected across said load resistance.

References Cited in the file of this patent

UNITED STATES PATENTS

| | | |
|---|---|---|
| 2,816,238 | Elliott | Dec. 10, 1957 |
| 2,864,961 | Lohman et al. | Dec. 16, 1958 |
| 3,001,139 | Bigelow | Sept. 19, 1961 |
| 3,025,418 | Brahm | Mar. 13, 1962 |
| 3,031,588 | Hilsenrath | Apr. 24, 1962 |